United States Patent Office 3,467,962
Patented Sept. 16, 1969

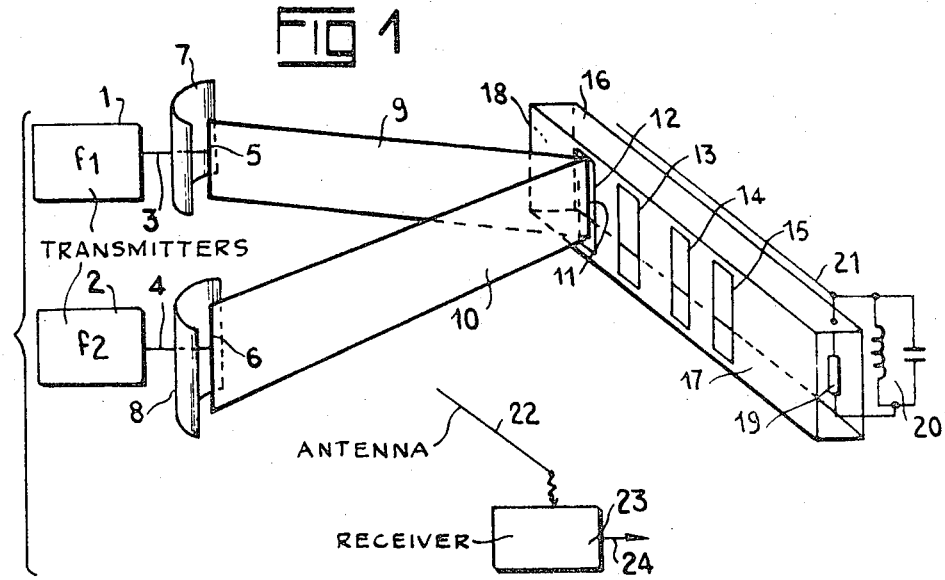
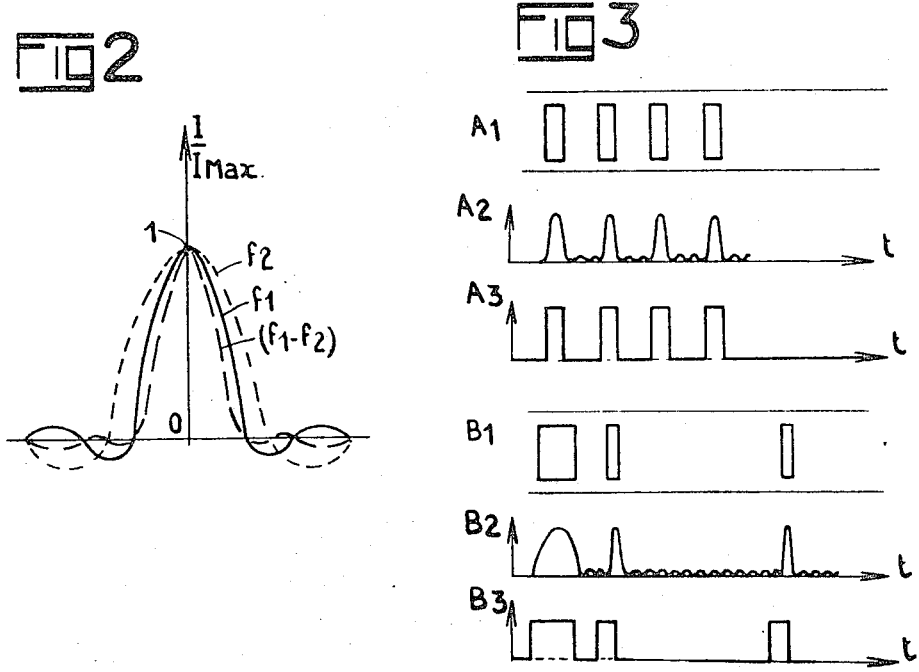

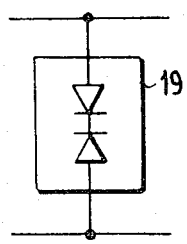
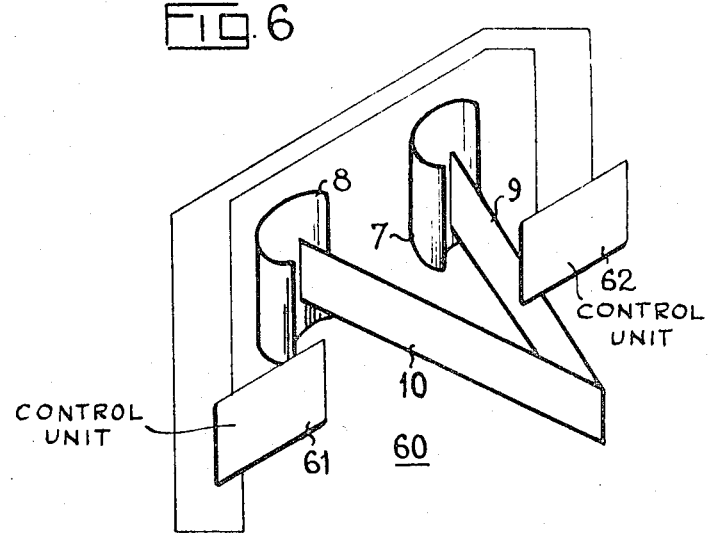
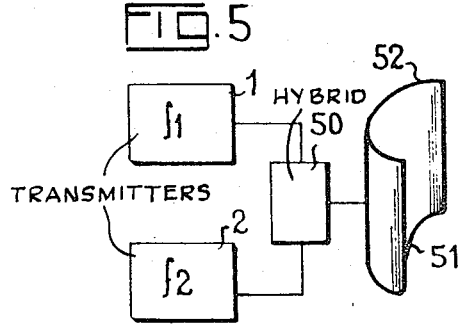
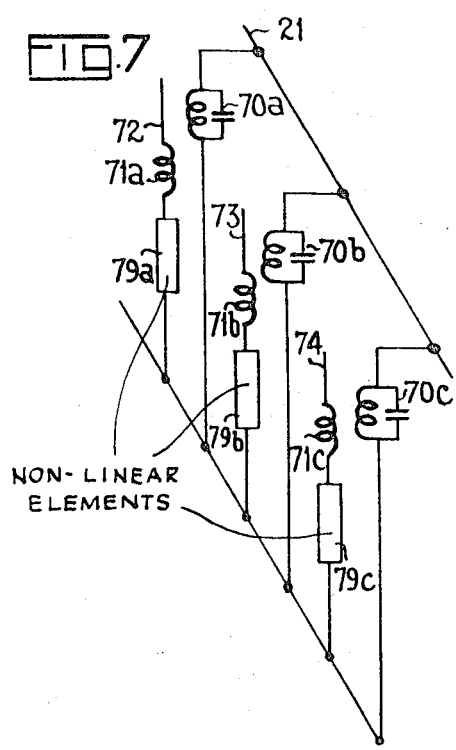

3,467,962
OBJECT IDENTIFICATION SYSTEM
Jacques Laplume, Gif sur Yvette, France, assignor to Societe d'Etudes Techniques et d'Entreprises Generales, a corporation of France
Filed Dec. 6, 1967, Ser. No. 688,425
Claims priority, application France, Dec. 15, 1966, 87,573
Int. Cl. G01s 9/56
U.S. Cl. 343—6.5            15 Claims

ABSTRACT OF THE DISCLOSURE

A pair of microwave radiation transmitters direct radiation at two discrete frequencies, $f_1$ and $f_2$ towards a target, which contains a non-linear circuit and a circuit tuned to the difference frequency $(f_1-f_2)$, re-radiating the difference frequency back to a receiver tuned thereto; by arranging the target for the impinging microwave radiation in coded form, the receiver will obtain a difference frequency signal in a code peculiar to the particular object.

---

The present invention relates to an identification system for objects, and more particularly to a system to detect objects remote from and moving with respect to a fixed identification station, such as a system to identify railroad cars or other vehicles.

Various systems utilizing radio waves have been proposed in order to detect and to identify objects passing an identification station. In general, these systems operate on the principle of reflection or diffusion of a wave beam, and pick up the echo by a receiver placed close to the transmitter. Reflective surfaces are placed on the object to be detected, in accordance with a predetermined code, in order to uniquely identify a particular object. In effect, relative motion of the object with respect to the beam provides a series of echoes, which series may be coded. This relative motion can be obtained either by motion of the object, or by scanning the beam over a stationary object.

Difficulty has been experienced in decoding the echoes from the reflective surfaces, since noise often hides the desired code, and parasitic echoes are difficult to suppress. One solution to the problem was to associate a re-transmitter with the object which re-transmits, on the same frequency or on a different frequency, a signal stronger than that of a simple echo and one which can be decoded readily. Yet, such a system is difficult and expensive in actual use because if many objects are to be identified, each one must be supplied with a separate and individual power source. It has already been proposed to avoid such power sources and to utilize, for distant identification, an energy pickup antenna in combination with a non-linear element, causing emission of radiation and utilizing the energy of the received radio waves.

It is an object of the present invention to provide an identification system, utilizing radioelectric energy directed towards an object spaced from the identification station, and without contact therewith, and providing a readily recognizable code to a receiver, without requiring a separate energy source at the object to be identified.

Subject matter of the invention

Briefly, in accordance with the present invention, a pair of transmitters are provided, each radiating at a predetermined frequency and directing beams of radiation, preferably at microwave frequency, towards a target associated with the object. If the object is movable, the radiation will scan over the target; if the object is stationary with respect to the radiators, a separate scanning arrangement may be used. The target has associated therewith a nonlinear element, such as a diode, a pair of oppositely biased diodes or the like and a resonant circuit tuned to the difference frequencies of the two radiating transmitters. A return-radiation antenna is associated with the object, and the identification station is provided with a receiver tuned to the difference frequency.

In accordance with the feature of the invention, the target is formed by a wave guide having windows therein, the non-linear element being coupled to the wave guide. The windows are arranged in accordance with a code unique to the particular object to be identified. Rather than a wave guide, formed with windows, a series of reception antennae associated with the non-linear element and the tuned circuit can be used, or a series of tuned circuits may be provided, each tuned to the difference frequency and associated with a non-linear element, to re-radiate at the difference frequency.

The structure, organization, and operation of the invention will now be described more specifically with reference to the accompanying drawings, wherein:

FIG. 1 is a general schematic view, partly in perspective, of the identification system of the present invention;

FIG. 2 is a wave diagram;

FIG. 3 is a diagram indicating the location of windows in the wave guide and signals appearing thereat;

FIG. 4 is a schematic diagram of a non-linear circuit;

FIG. 5 is a partly schematic diagram of a different form of radiating antennae;

FIG. 6 is a partly schematic showing of a scanning arrangement for the bundle of radiation; and FIG. 7 is a schematic diagram of a different form of target.

Referring now to the drawings and particularly to FIG. 1: two fixed transmitters 1, 2, radiating at frequencies $f_1$ and $f_2$, respectively, are located at the identification station. Preferably, the radiation $f_1$, $f_2$ is in the centimeter or millimeter wave length range. The generated signals are applied by means of transmission lines 3, 4, to a pair of radiators 5, 6. The radiators 5, 6 are placed in the focal points of reflectors 7, 8, which are preferably cylindrical-elliptical. The radiators 5, 6 are so placed that they are parallel to the generatrices of cylindrical sections, the radiators being located at one of the focal points of the ellipse. The two cylindrical-elliptical reflectors 7, 8 are so oriented that the second focal point is coincident at a point 11, the point 11 being common to both of the elliptical forms of the reflectors 7 and 8. Additionally, point 11 also appears at the surface 17 of a target associated with the object to be identified.

The beamed electromagnetic radiation, illustrated schematically at 9, 10, and derived from antennae 5, 6, thus converge towards the target. The target is a wave guide 16, placed on the object. In order to provide a coded identification, the side wall 17 thereof which faces the reflectors 7 and 8 is formed with windows 12, 13, 14 and 15, for example. If the object is moving transversely with respect to the width of the beams 9, 10, the focal point 11 scans the surface 17 of the target. When the focal point 11 is, for example, opposite the window 12 (see FIG. 1) the electromagnetic energy delivered by the transmitters 1 and 2 penetrates into wave guide 16, from which it will be guided either directly, or by reflection from the end wall 18 of the wave guide 16 towards a non-linear element 19 placed within the interior of wave guide 16.

The non-linear element 19 may be a diode, for example an inversely biased diode also known as a varactor, and forming a capacitance the value of which depends on the potential and the bias applied thereto. It is also possible to utilize avalanche diodes, tunnel diodes, or ordinary rectifier diodes, or a ferromagnetic element. In general, the non-linear element 19 may consist of any passive device capable of mixing or multiplying frequencies and it is not necessary that it has a very high frequency response nor an especially low internal inherent noise.

When the target is penetrated by the currents induced from the transmitters 1, 2 at frequencies $f_1$ and $f_2$, the frequencies $f_1$ and $f_2$ will beat in the non-linear element 19 and give rise to sum and difference frequencies ($mf_1 \pm nf_2$), wherein $m$ and $n$ are whole numbers. The lowest frequency, of course, will be the difference frequency ($f_1 - f_2$). This frequency is accentuated and filtered in the tuned circuit 20 and re-emitted by an antenna 21 associated with the target. Of course, circuit 20 is tuned to this particular difference frequency.

The re-emitted energy, transmitted from the object-antenna 21 is received by antenna 22 associated with a receiver 23, likewise tuned to the difference frequency $f_1 - f_2$. This receiver can have a sharp tuning and be essentially insensitive to the much higher transmission frequencies $f_1$ or $f_2$, and will not be subject to parasitic or noise echoes, which noise and parasitic echoes will appear at the difference frequency only highly attenuated and occurring only due to the Doppler effect.

During the entire time when a window of the wave guide 16 passes in front of the waves 9, 10, that is in front of the focal point 11, the output 24 of receiver 23 will have a signal appear thereat which is roughly proportional to the product of the intensity of the radiation derived from transmitters 1 and 2. Thus, at output 24 of receiver 23, a series of pulses will occur which correspond to the position of the windows as will be further explained in connection with FIG. 3. This will be true, as a first approximation, if the detection characteristics of the non-linear element have an approximately exponential characteristic.

Actually, diffraction and interferences will develop at the focal point 11 of the two radiated beams. Measuring the electromagnetic field caused by both of the lines, separately, at point 11, one obtains a diagram generally represented at FIG. 2, and indicated separately at $f_1$, $f_2$ with respect to the beams 9 and 10, respectively. The maximum of the radiated field is a maximum exactly at the focal point. Departing in a direction towards the left or right from the focal point, a series of secondary maxima of decreasing amplitude will be obtained, which maxima are alternatively positive and negative. Thus, as a window passes in front of focal point 11, the impulse obtained therefrom will not be a single pulse, but rather a series of pulses corresponding to these successive smaller maxima. In order to eliminate noise, and unwanted radiation as much as possible, receiver 23 can be arranged to have a threshold which is somewhat higher than the first secondary maximum, that is to have a detection threshold at about 10% of the expected value of the principal maximum to be expected. Additionally, the location and extent of the windows, and the frequencies of the radiators can be so matched to each other that the first secondary maxima do not coincide with the location of subsequent windows in order to avoid superimposition of sequential unwanted signals. Additionally, the secondary maxima can be further reduced so that the first secondary maximum, for example of wave $f_1$ corresponds to the first zero of the second wave, $f_2$ (see FIG. 2). Since the composite difference frequency has an amplitude which, as a first approximation, is about proportional to the product of the amplitudes of the frequencies $f_1$ and $f_2$, secondary maxima are reduced to practically zero each time one of the waves, separately goes through zero and thus secondary maxima corresponding to the difference frequency $f_1 - f_2$ are strongly attenuated. This result can be enhanced by proper positioning and adjustment of the openings and the profile of the reflectors 7 and 8 so that essentially the entire radiation is along the axes of the ellipse rather than being dispersed.

The non-linear element 19 preferably has a non-linear characteristic which is highly exponential, that is highly dependent upon the level of the incident signal. Such a non-linear characteristic is obtained from a rectifier diode or from two oppositely biased diodes. In such an arrangement, the principal maximum, as illustrated in the diagram of FIG. 2, is strongly favored with respect to secondary maxima.

Referring now to FIG. 3: If a target having windows as illustrated in the diagram $A_1$ passes in front of beams 9, 10, that is if the windows are located at the focal point 11, the output 24 of a receiver 23 will have a pulse train, with respect to time, substantially as seen in graph $A_2$. These pulses are rounded, similar to the interference or diffraction diagram (FIG. 2) and have a horizontal extent doubled largely by the size of the windows. Between the pulse pips, noise signals will be present due to secondary maxima and stray reflections. Any pulse shaping circuit, for example filter circuits having high level and low level thresholds, and suitably chosen, may be used to reconstitute the output into a train of square wave pulses as seen at $A_3$, the passage of time corresponding to the location of the windows, in space.

If the size of the windows is varied, and the spacing is made irregular, as seen for example in graph $B_1$, a pulse train of variable size and recurrence as seen in graphs $B_2$ and $B_3$ will be obtained, $B_2$ being the output from receiver 24 and the graph of $B_3$ being a similar output after pulse-shaping. By decoding the pulses similar to graph $B_3$, in well-known decoding circuitry, the object can be uniquely identified.

In order to obtain a readily identifiable output reading, that is in order to obtain a code which is uniform on a time-scale, it is desirable to provide relatively constant motion between the windows 12-15 of the wave guide and the waves 9, 10 impinging thereon at the focal point 11.

The windows themselves should of course be shaped such that the radiation intended for a particular window does not penetrate into adjacent windows; making the space between windows at least twice that of the width of the principal lobe satisfies this requirement. In accordance with optical theory relating to diffraction at a focal point, the width of the principal lobe of the diffraction diagram is given by:

$$d = 2\frac{FL}{a}$$

wherein F is the focal length of the reflector, L the wave length and $a$ the reflector opening, along the horizontal axis. Thus, for example, with a focal length of $F=50$ cm., a wave length L of 0.8 cm. and an opening $a=100$ cm., the width of the principal lobe will be $d=0.8$ cm. Spacing the windows by a distance of $2d=1.6$ cm., one can place approximately 40 windows on a side 17 of a wave guide 16 which is about 70 centimeters long.

Instead of utilizing a pair of separate antennae and radiators as shown in FIG. 1, a single radiator, as seen in FIG. 5, may be provided. Transmitters 1, 2 feed into a hybrid or mixer circuit 50, which then supplies a radiator 51 in a single reflector 52. Other arrangements providing a pair of radio waves of frequencies $f_1$ and $f_2$, and providing the same result, may also be used. FIG. 8 illustrates an alternative wherein a wave of frequency $f_1$ can be modulated in modulator 80 by a much lower frequency, and corresponding to the above mentioned difference frequency $f_1-f_2$ which is generated in oscillator 81. The resultant signal is radiated towards the target via transmitter 82. The non-linear element 19 will then detect the modulation of the wave and will re-radiate at that modulation difference frequency, to which the receiver 23 is also tuned.

Windows of the wave guide 16 need not be rectangular, nor need they be directed or oriented in the same direction.

If it is desired to obtain constant speed scanning, for example between a fixed transmitter station and a likewise fixed object to be identified, the waves themselves can be scanned across the target. FIG. 6 illustrates an arrangement for scanning waves, generated in accordance with FIG. 1. The target and the transmitters themselves have been omitted. The deflection system 60 includes a pair of control units schematically shown as 61, 62 and interconnected by lines 63. These units ensures the scanning by the reflectors either by mechanical or electronic means as is the case with the radar technique. Such a control need not be actually emphasized.

The target need not be a wave guide; it may include a plurality of radiation receivers, such as stub antennae 72, 73, 74, coupled by means of coils 71a, 71b, 71c to tuned circuits 70a, 70b, 70c. Each stub antenna is further connected to individual non-linear elements 79a, 79b, 79c. The tuned circuits 70a, 70b, 70c are again connected to the re-radiation antenna 21. Of course, if only a single object is to be identified, only a single non-linear element 19 (or 79a) need be used, associated with a re-transmitting antenna and a tuned circuit.

FIG. 4 illustrates, in schematic form, a pair of back-to-back diodes which together may form the non-linear element 19 of FIG. 1, or 79 of FIG. 7.

Essentially therefore, the present invention relates to the identification of objects, without contact, by directing radiation thereagainst of more than one frequency, and utilizing a non-linear element and resonance circuit, tuned to the difference frequencies for detection of re-emitted radiation.

I claim:
1. Identification system for contact-less identification of objects comprising:
   a pair of radiation transmitter means (1, 2), each radiation transmitter independently directing radiation of a predetermined frequency ($f_1$ and $f_2$) differing from the frequency of the other radiation transmitter towards the object;
   a receiver (23) tuned to the difference frequency ($f_1-f_2$) and located to receive radiation re-emitted from the object;
   and a target located on the object to be identified, in radiation-receiving and re-transmitting relationship to the radiation emitted from said transmitter means, and to be received by said receiver, respectively, said target including non-linear means (19) and a resonance circuit (20) tuned to said difference frequency ($f_1-f_2$).

2. System as claimed in claim 1, wherein said transmitter means are microwave radiators and said target is a wave guide formed with windows (12–15) therein, located in radiation-receiving relationship to said microwave radiation, and said wave guide means is coupled to said resonance circuit tuned to the difference frequency, and to said non-linear element; and a re-transmission antenna (21) is provided and coupled to said resonance circuit tuned to said difference frequency.

3. System as claimed in claim 2, wherein said wave guide windows are spaced relative to each other and have an extent lengthwise of the wave guide corresponding to a code representative of the object to be identified.

4. System as claimed in claim 3, wherein the windows in the wave guides are located to leave space between adjacent windows which is at least equal to twice the width of the principal lobe occurring as a result of the mixing of the radiation emitted from both said transmitter means.

5. System as claimed in claim 1, wherein said radiation transmitters radiate in the microwave region and include antennae (5, 6) located at the focal points of cylindrical-elliptical reflectors (7, 8), said cylindrical-elliptical reflectors being oriented to guide the radiation from each transmitter to impinge at the same point on the target, said same point being the other focal point of the ellipsis forming the elliptical reflectors, whereby beat frequencies will be produced at the target.

6. System as claimed in claim 5, wherein said radiation transmitter means transmit first and second independent radiations having first and second different frequencies, the first secondary maximum of the interference diagram with respect to the frequency of one of said radiations corresponds to the first null of the interference diagram with respect to the frequency of the other of said radiations.

7. System as claimed in claim 1, wherein said non-linear circuit has a variable response characteristic and includes a pair of oppositely connected diodes, one end of said pair being connected to an input terminal of said non-linear circuit and the other end of said pair being connected to another input terminal of said non-linear circuit.

8. System as claimed in claim 1, including a single antenna connected to both said transmitter means and directing radiation from both said transmitter means towards said target.

9. System as claimed in claim 1, including radiation deflection means scanning both of said transmitted radiations across said target to develop beat frequencies thereat.

10. System as claimed in claim 1, wherein said target includes a plurality of non-linear elements and resonance circuits, located on said object with respect to each other to be successively exposed to incident radiation from said transmitter means.

11. In an object identification system,
   means independently directing microwave radiation at two frequencies ($f_1$, $f_2$) towards a target associated with said object;
   a tuned circuit and a non-linear element in radiation-receiving relation connected to said target, said tuned circiut being tuned to the difference frequency ($f_1-f_2$) of said radiation;
   re-transmission means connected to said non-linear element and said tuned circuit; and a receiver, in radiation-receiving relationship to said re-transmission means, said receiver being tuned to said difference frequency ($f_1-f_2$).

12. Identification system for contact-less identification of objects comprising:
   a single transmitter means directing radiation towards the object at a predetermined frequency ($f_1$) which is amplitude-modulated by a modulation frequency ($f_1-f_2$);
   a receiver tuned to the modulation frequency ($f_1-f_2$) and located to receive radiation re-emitted from the object; and
   a target located on the objec tto be identified, in radiation-receiving and re-transmitting relationship to the radiation emitted from said transmitter means, and to be received by said receiver, respectively, said target including non-linear means (19) and a resonance circuit (20) tuned to said modulation frequency ($f_1-f_2$).

13. System as claimed in claim 12, wherein said non-linear circuit has a variable response characteristic and includes a pair of oppositely connected diodes, one end of said pair being connected to an input terminal of said non-linear circuit and the other end of said pair being connected to another input terminal of said non-linear circuit.

14. System as claimed in claim 12, wherein said target is a wave guide formed with windows (12–15) therein, located in radiation-receiving relationship to said radiation, and said wave guide means is coupled to said resonance circuit tuned to the modulation frequency, and to said non-linear element; and a re-transmission antenna (21) is provided and coupled to said resonance circuit tuned to said modulation frequency.

15. System as claimed in claim 14 wherein said wave guide windows are spaced relative to each other and have an extent lengthwise of the wave guide corresponding to a code representative of the object to be identified.

References Cited
UNITED STATES PATENTS

| | | |
|---|---|---|
| 3,145,380 | 8/1964 | Currie. |
| 3,022,492 | 2/1962 | Kleist et al. |
| 3,384,892 | 5/1968 | Postman. |

RODNEY D. BENNETT, JR., Primary Examiner

MALCOLM F. HUBLER, Assistant Examiner